No. 872,338. PATENTED DEC. 3, 1907.
E. H. GOLD.
FITTING FOR FLUID SUPPLY SYSTEMS.
APPLICATION FILED MAR. 8, 1906.
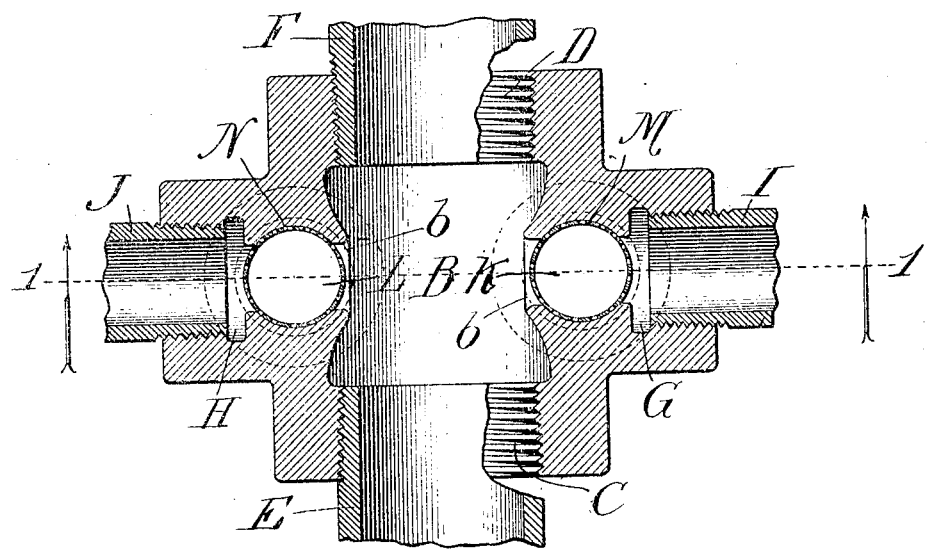
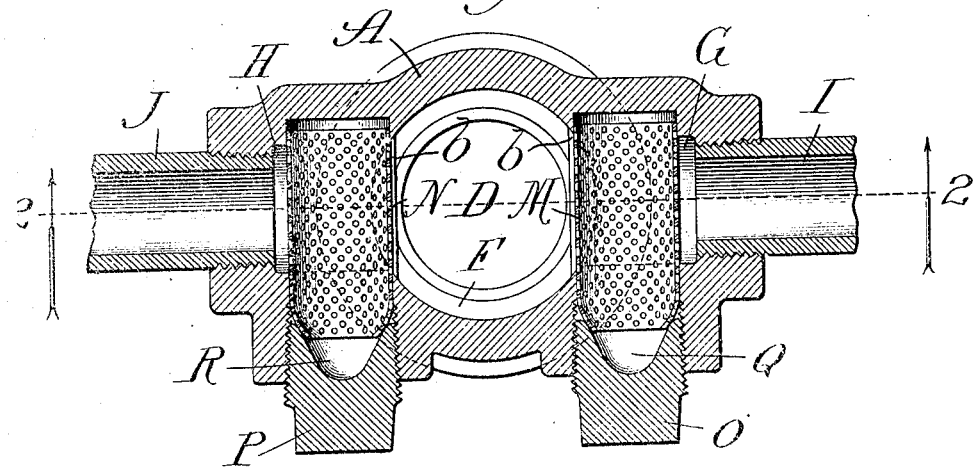

UNITED STATES PATENT OFFICE.

EGBERT H. GOLD, OF CHICAGO, ILLINOIS.

FITTING FOR FLUID-SUPPLY SYSTEMS.

No. 872,338.  Specification of Letters Patent.  Patented Dec. 3, 1907.

Application filed March 8, 1906. Serial No. 304,924.

*To all whom it may concern:*

Be it known that I, EGBERT H. GOLD, a citizen of the United States, residing at Chicago, in the county of Cook and State of Illinois, have invented certain new and useful Improvements in Fittings for Fluid-Supply Systems, of which the following is a specification.

This invention relates to improvements in fittings for fluid supply systems, and has special reference to a pipe fitting adapted for use where it is desirable to interpose a screen or strainer between a pipe conveying fluid and another pipe branching therefrom.

The invention is adapted to be used in a variety of situations, but is particularly adapted for use in a system of fluid heating for railway cars, wherein a steam train-pipe extends beneath the cars throughout the length of the train. From this train-pipe branch off, under each car, one or more service or supply pipes for conducting steam to the radiating system of the car.

The principal object of the present invention is to provide a pipe-fitting adapted to be interposed in the steam train-pipe of a car and to serve as a cross connection or coupling between the train-pipe and the lateral supply pipe, or pipes, said coupling having therein a strainer or screen adapted to intercept dust or other foreign matter and prevent the same from passing into the lateral supply pipes, said strainer or screen being readily removed and replaced.

In the accompanying drawings I have shown an application of my invention to a form of pipe-fitting known as a "cross," or, when fitted with some form of strainer, as a "strainer cross". When a strainer cross is employed in a steam train-pipe, the steam is permitted to pass freely through the cross in the direction of the length of the train-pipe, but is caused to pass through screen material before entering the branch or service pipes. Under existing and well understood conditions it sometimes becomes necessary to remove and replace the screens or strainers. With the strainer crosses heretofore used this is a matter involving considerable trouble, as, by reason of their construction, it becomes necessary to disconnect some of the pipes.

In the drawings, Figure 1 is a vertical, sectional view of a strainer cross comprising one embodiment of my invention, the section being taken on the line 1—1 of Fig. 2, looking in the direction indicated by the arrows; and Fig. 2 shows a section on the line 2—2 of Fig. 1, looking in the direction indicated by the arrows.

In these figures like reference characters indicate similar parts throughout.

In the drawings, A is a shell or casing having therein a chamber B. Opening into this chamber B are the ports C and D, these ports being interiorly screw-threaded to receive the threaded ends of the pipes E and F. Leading from the chamber B are the lateral cross ports G and H, these ports being provided with screw-threads to receive threads upon the ends of the service or supply pipes I and J. Between the chamber B and the cross port G is a cylindrical chamber K. This chamber K is so disposed with relation to the various ports as to have its axis perpendicular to a line passing through the cross ports G and H. A similar chamber L is located between the chamber B and the cross port H. Adapted to be inserted into these cylindrical chambers K and L are cylindrical or tubular strainers M and N. These strainers may be made of perforated sheet metal, or, if desired, may be formed of screen material.

The mouths of the chambers K and L are adapted to be closed, after the insertion of the strainers M and N, by screw-threaded plugs O and P. The strainers M and N may, if desired, be formed so as to have their lower ends inwardly tapered, the inner surface of the plugs O and P being formed with depressions Q and R having inclined sides. The object of giving this form to the strainers and plugs is to prevent endwise crushing and buckling of the strainers when the plugs O and P are screwed in tightly against the strainers. Such endwise compression might, if permitted, cause the swelling and binding of the strainers in their chambers and prevent the easy removal of the same, but, by reason of the mutually conforming surfaces of the strainers and plugs, any end compression on the strainers will tend to force the strainer into the plug. As it is very desirable to avoid crushing or bending of the strainers, which will render their removal difficult, I prefer this cylindrical form of strainer, although the particular form is not essential to my invention, and I further preferably protect the strainer by admitting steam, or other fluid, to the strainer chamber through a relatively narrow, elongated port b, as shown in the drawing.

It will thus be seen that, broadly, my invention comprises a fitting having any steam passage across which is disposed a removable strainer of any suitable form, which may be removed and replaced through an opening other than is formed by the pipes or passages constituting the fitting provided for such purpose without interfering with the normal connections of the fitting, while, in the specific embodiment of this invention which is shown in the drawings, I provide a strainer in the form of a cylinder, which is best adapted to resist the crushing pressure of the steam, which might otherwise jam the strainer in its chamber, and this cylindrical strainer is preferably so mounted as to have end play within its chamber, so as to avoid endwise crushing, which might also jam it in position and render its removal difficult, and, as an additional or alternative feature, the cylindrical strainer is inwardly tapered at one end, where it may abut against the walls of an inwardly tapering recess in the plug used to close the strainer chamber, so that, in case the tightening of the plug tends to crush the strainer endwise, such crushing force will tend to force the tapered end of the strainer into the recess in the plug, rather than to bulge or distort the strainer, so as to render its removal from its chamber difficult. In the application of this form of strainer cross in practical work, the pipes E and F are parts of the train-pipe, the casing A becoming also a part of said train-pipe, and the chamber B providing an unobstructed and unrestricted passage for steam therethrough, the full size of the interior of the train-pipe.

The pipes I and J, leading from the cross ports G and H, will be the lateral feeders, or supply pipes, leading to the radiating systems of the car. The passage of any dirt, pieces of hose, or other foreign matter, from the train-pipe into the laterals will be effectually prevented by the strainers M and N. It will be seen that the steam from the train-pipe must pass through one of these strainers twice before entering the supply pipe and that this feature must afford a very efficient straining or screening of the steam.

When it is desired to remove the strainers, for cleaning or purposes of renewal, this may be effected by the simple removal of the plugs O and P, when these strainers may be easily withdrawn and new ones inserted in their places. In all devices of this class heretofore used, so far as I am aware, it is necessary, before the strainers can be removed, to disconnect some of the pipe connections. As this is, of course, a matter of some trouble and requires considerable time, the strainers are not inspected and, consequently, they corrode and disintegrate, and not only cease to effectively prevent the entrance of foreign material through the lateral or feed pipes, but, in fact, pieces of the disintegrated strainers will be carried into the feed pipes by the movement of the steam and tend to interfere with the operation of the valves and of other parts of the apparatus.

By the use of the invention herein shown and described, I am enabled to provide a pipe-fitting of this character which is of simple and economical construction, in which the straining or screening is effectually accomplished, and in which the inspection, removal and replacing of the strainers may be done with a minimum of trouble and expenditure of time.

It will be seen that the chambers K and L, being cylindrical in form, may be easily finished to the proper size by boring operations, and that there is nothing about the device, as a whole, that requires careful machining or accurate workmanship.

I claim:

1. A pipe fitting provided with a fluid passage extending therethrough, a second passage leading from the first named passage, and a strainer interposed at the junction of the two passages, said fitting having an opening for the insertion and removal of the strainer, and means for closing said opening.

2. A pipe-fitting provided with a fluid passage extending through the fitting and with a feed passage opening therefrom, and a strainer interposed across said feed passage, said fitting being provided with an additional opening extending at an angle to both of said feed passages for the insertion of said strainer, and with a closure for said opening.

3. A pipe-fitting provided with a fluid passage, and a strainer interposed across said fluid passage, said fitting being also provided with a separate opening for the insertion and removal of said strainer and with a closure for said opening, said strainer and said closure being provided with mutually conforming surfaces, whereby end pressure upon said strainer will tend to deflect said strainer from said closure.

4. A pipe-fitting comprising a fluid passage, and a tubular strainer interposed across said fluid passage so as to have play transversely of said passage, said fitting being also provided with an opening for the insertion of said strainer and with a closure for said opening comprising a device engaging with said strainer.

5. A pipe-fitting provided with a fluid passage, and a cylindrical strainer interposed transversely of said passage, said fitting being also provided with an opening for the insertion and removal of said strainer and with a closure for said opening, said closure being provided on its inner face with a recess having an inwardly tapered wall and said strainer being correspondingly tapered at one end to engage the tapered wall of said recess.

6. A pipe-fitting comprising a fluid passage, a strainer extending transversely of said passage, recesses being provided to receive the ends of said strainer, one end of said strainer being tapered, and said fitting being provided also with an opening whereby said strainer may be inserted in said recess and removed therefrom, and a closure for said opening inclosing and engaging the tapered end of the strainer.

7. A pipe fitting comprising a casing having a main fluid passage-way extending unobstructedly through the casing and a passage leading from said main passage at an angle thereto, a strainer chamber formed in the casing at the juncture of said passage-ways, and a tubular strainer in said chamber.

8. A train pipe-fitting provided with an unobstructed main fluid passage, a lateral passage opening therefrom, a strainer interposed transversely of said lateral passage and at the side of the main fluid passage, and means for inserting and removing said strainer without disturbing the normal fluid connections of said fitting.

9. In a pipe-fitting, the combination of a casing having an inlet port, an outlet port leading from the casing at an angle to the inlet, a cylindrical chamber between said ports, and a tubular strainer adapted to be inserted into said chamber and, when in position in said chamber, to have its axis perpendicular to the axis of the outlet port.

10. In a pipe-fitting, the combination of a casing having a chamber therein, a port opening into said chamber, a port opening from said chamber, and a cylindrical strainer interposed between the ports and in said chamber and said last-named port with its axis transverse to both of said ports.

11. In a strainer cross, the combination of a casing having a passage therethrough, cross ports opening into said passage, a cylindrical chamber in said casing between the passage and one of the cross ports at the side of said passage and adapted to receive a tubular strainer, and a screw-threaded plug adapted to be inserted into the mouth of said chamber after the strainer has been inserted into said chamber, to close said chamber and to retain the strainer therein.

12. In a pipe-fitting, the combination of a casing having a chamber therein, ports leading into and out of said chamber, a cylindrical strainer having a tapered end disposed across one of said ports, and a plug having a tapered hollow in one end adapted to engage with the tapered end of the strainer.

13. In a pipe fitting, the combination of a casing having a chamber therein, ports leading into and out of said chamber, with a cylindrical strainer in said casing and disposed across one of said ports, the casing formed with an aperture through which the strainer may be removed from the chamber and a plug to close the aperture and adapted to extend around and engage one end of the strainer.

14. The combination with a fitting having a passage-way therethrough into which the main pipe connections are received, a cylindrical chamber transverse to said passage-way and opening into the same, and a passage-way extending into said chamber in which a branch pipe connection is received, of a cylindrical strainer in said chamber extending across the opening leading to the main pipe and the opening leading to the branch pipe, and removable means located at one end of the strainer for closing said chamber.

15. A pipe fitting comprising a shell having a main fluid passage extending therethrough, a feed passage intersecting the main fluid passage, and a cylindrical strainer chamber at the intersection of said passages at right angles to both and extending above and below the same, in combination with a cylindrical strainer having substantially the same diameter as its chamber and greater in length than the length of the opening between said chamber and said passages, said chamber open at one end, so that the strainer may be inserted and removed, and means for closing said opening.

EGBERT H. GOLD.

Witnesses:
G. Y. SKINNER,
O. R. BARNETT.